(12) United States Patent
Sewell

(10) Patent No.: US 6,910,544 B2
(45) Date of Patent: Jun. 28, 2005

(54) WORK MACHINE ARRANGEMENT

(75) Inventor: Andrew J. Sewell, Northumberland (GB)

(73) Assignee: Caterpillar Inc, Peoria, IL (US)

( * ) Notice: Subject to any disclaimer, the term of this patent is extended or adjusted under 35 U.S.C. 154(b) by 84 days.

(21) Appl. No.: 09/973,337

(22) Filed: Oct. 9, 2001

(65) Prior Publication Data

US 2002/0070061 A1 Jun. 13, 2002

(30) Foreign Application Priority Data

Dec. 9, 2000 (GB) .............................. 0030137

(51) Int. Cl.$^7$ ..................... B60K 11/04; B62D 21/00; B66C 23/00; E02F 3/48; A01C 23/02
(52) U.S. Cl. .................. 180/68.4; 180/312; 180/89.12; 180/89.19; 180/324; 180/291; 414/700; 414/718; 414/685; 414/547; 280/781; 37/395; 37/397; 37/443; 111/101
(58) Field of Search ............................. 180/68.4, 54.1, 180/68.6, 300, 311, 312, 313, 89.1, 89.12, 89.19, 6.2–6.7, 324, 291, 297; 280/781, 785; 212/195, 291, 264, 180, 181, 306, 347; 123/41.33, 41.55; 414/700, 718, 728, 547, 685; 111/101; 37/395, 397, 304, 443; 56/328.1, 329; 214/141

(56) References Cited

U.S. PATENT DOCUMENTS

| | | | | |
|---|---|---|---|---|
| 1,410,190 A | * | 3/1922 | Kaiser ....................... 182/66.2 |
| 2,697,609 A | * | 12/1954 | Chase et al. ................. 239/657 |
| 3,565,203 A | * | 2/1971 | Ashton ......................... 180/68 |
| 3,599,814 A | * | 8/1971 | Brownfield .................. 214/141 |
| 3,708,000 A | | 1/1973 | Duffty et al. |
| 3,786,891 A | * | 1/1974 | Vogelaar et al. .......... 180/68 R |
| 3,788,418 A | * | 1/1974 | Clancy et al. ............. 180/68 R |
| 3,967,744 A | | 7/1976 | Goyarts |
| 3,985,248 A | | 10/1976 | Liegel et al. |
| 4,039,094 A | | 8/1977 | Grove |
| 4,042,135 A | | 8/1977 | Pugh et al. |
| 4,147,263 A | | 4/1979 | Frederick et al. |
| RE30,021 E | | 6/1979 | Olson et al. |
| 5,106,257 A | | 4/1992 | Braud et al. |
| 5,255,752 A | * | 10/1993 | Nakamura et al. ........... 180/6.7 |
| 5,478,192 A | | 12/1995 | Bentivoglio |
| 5,494,397 A | | 2/1996 | Wilson |
| 5,595,398 A | * | 1/1997 | Brown ..................... 280/763.1 |
| 5,687,809 A | | 11/1997 | Braud |
| 5,711,095 A | * | 1/1998 | Oda et al. ...................... 37/410 |
| 5,743,149 A | | 4/1998 | Cullity |
| 5,816,350 A | * | 10/1998 | Akira et al. ................ 180/68.1 |
| 5,924,478 A | * | 7/1999 | Crocker ......................... 165/95 |
| 6,024,164 A | * | 2/2000 | Sorbel .......................... 165/41 |
| 6,024,232 A | | 2/2000 | Helgesson |
| 6,073,594 A | | 6/2000 | Tsukiana et al. |

(Continued)

FOREIGN PATENT DOCUMENTS

| | | | | |
|---|---|---|---|---|
| EP | 0 577 388 | | 1/1994 | |
| EP | 0 692 448 | | 1/1996 | |
| GB | 2 337 496 | | 11/1999 | |
| JP | 406108494 A | * | 4/1994 | ................... 37/443 |
| JP | 409242116 A | * | 9/1997 | ................ 180/68.4 |
| JP | 410046625 A | * | 2/1998 | ................ 180/68.4 |
| JP | 411208290 A | * | 8/1999 | ................ 180/68.4 |

Primary Examiner—Christopher P. Ellis
Assistant Examiner—G B Klebe
(74) Attorney, Agent, or Firm—Murgitroyd

(57) ABSTRACT

In the operation of work machines of the type having an extensible arm, the maximum reach of the arm for a given work machine is limited by such factors as the vehicle's weight, body size and engine placement. The present invention provides for a work machine arrangement in which a work machine has an engine cooling apparatus mounted to the work machine body such that the engine cooling apparatus's longitudinal axis is oriented substantially parallel to the arm longitudinal axis.

14 Claims, 2 Drawing Sheets

U.S. PATENT DOCUMENTS

| | | |
|---|---|---|
| 6,079,937 A | 6/2000 | Cook |
| 6,134,816 A * | 10/2000 | Murakami et al. ............. 37/443 |
| 6,152,253 A * | 11/2000 | Monaghan .................. 180/291 |
| 6,205,665 B1 * | 3/2001 | Anderson et al. .......... 29/897.2 |
| 6,554,558 B2 * | 4/2003 | Knight ........................ 414/685 |
| 6,726,436 B2 * | 4/2004 | Baumann et al. ........... 414/680 |
| 2001/0006128 A1 * | 7/2001 | Contoli et al. ............. 180/68.4 |
| 2004/0131459 A1 * | 7/2004 | Masumoto et al. ......... 414/718 |

* cited by examiner

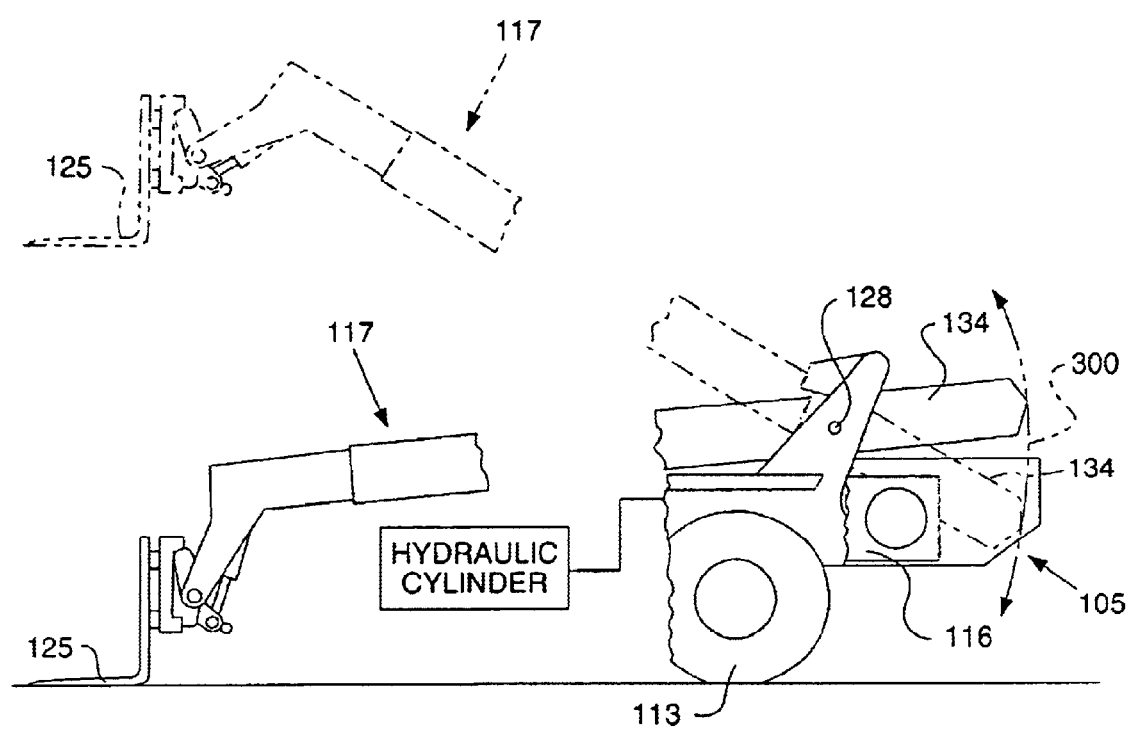

WORK MACHINE ARRANGEMENT

DESCRIPTION

1. Technical Field

This invention relates to a work machine arrangement and more particularly to a work machine arrangement in which the work machine has a rear-mounted radiator oriented substantially parallel to a longitudinal axis of a work machine arm.

2. Background

Typically, work machines of the type often referred to as boom trucks or telehandlers use an attachment mounted to a telescopic arm to raise loads to, or lower loads from, an elevated position. The extension of the arm, or its reach, is typically limited by such physical parameters as the machine's body size, weight, and engine placement. Consequently, if the end user desires to obtain a machine with a needed reach, the operator must obtain a machine having those physical parameters corresponding to the needed reach requirement. However, it may oftentimes be the case in which the size and weight of the machine needs to be minimized while requiring a reach range exceeding the machines physical parameters. This situation may arise, for example, if the work machine is typically transported to a work site by another machine such as a highway truck, airplane or train.

Prior art attempts to solve the aforementioned problems can be found in U.S. Pat. No. 3,985,248, issued on Oct. 12, 1976 to Reinald D. Liegel et al., and U.S. Pat. No. 6,024,232, issued on Feb. 15, 2000 to Kenneth Helgesson. Both teach boom trucks in which the arm is pivotally coupled to the boom truck body at a horizontal location substantially above the cab. Although both designs may be adequate for their respective intended purposes, both designs may be problematic for those applications in which the vehicle height is a concern.

The present invention is directed to overcoming one or more of the problems as set forth above.

SUMMARY OF THE INVENTION

According to an aspect of the present invention, a work machine arrangement for a work machine is provided. The work machine has a work machine body and an extensible arm, connected to the work machine body, having an arm longitudinal axis. An engine cooling apparatus is mounted to the work machine body. The engine cooling apparatus has a engine cooling apparatus longitudinal axis oriented substantially parallel to the arm longitudinal axis.

BRIEF DESCRIPTION OF THE DRAWINGS

FIG. 3 is a diagrammatic elevation view of the rear portion of the work machine of FIG. 1 illustrating two orientations of the arm.

DETAILED DESCRIPTION

Figure 1:
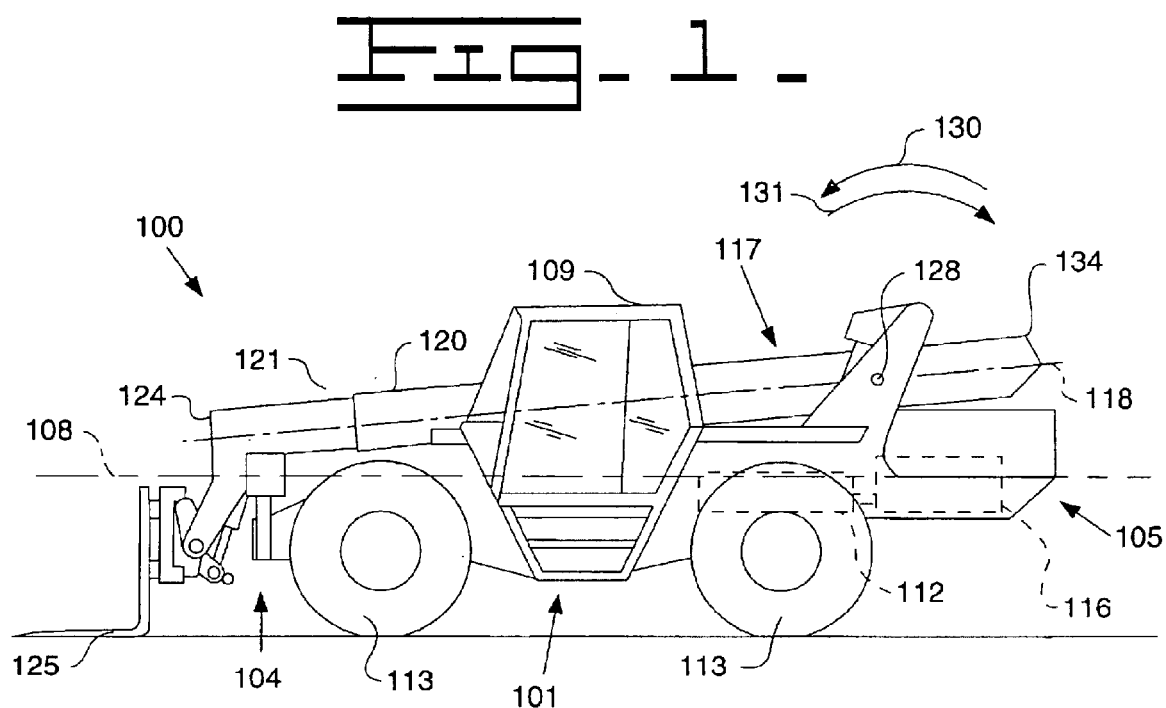
FIG. 1 is a diagrammatic elevation view of a work machine that embodies the principles of the present invention.

Referring to the drawings, an exemplary work machine of the type typically termed a telehandler or boom truck is shown generally at 100 and comprises a body 101 having a front portion 104, a rear portion 105, and a body longitudinal centerline denoted 108 extending between the front and rear portions 104, 105. The body 101 includes a cab portion 109 which is preferably oriented to either side of the body longitudinal centerline 108 (as shown best in FIG. 2). An engine 112 is mounted adjacent the rear portion 105 and provides the motive force used to drive a set of wheels 113 coupled to the work machine 100. Also shown is a cooling apparatus, preferably a radiator 116, operatively coupled to the engine 112, for thermally regulating the engine's temperature.

An arm 117 is coupled to the body 101 adjacent to the rear portion 105 of the work machine 100 and includes an arm longitudinal axis 118. The arm 117 preferably comprises an extensible arm, and more preferably a telescopic arm having a substantially hollow base portion 120 sized to receive a telescoping portion 121 which is extendable and retractable, relative to the base portion 120, by conventional means such as, for example, hydraulic pressure. The telescoping portion 121 includes a distal end 124 which is adapted to receive an assortment of attachments including a fork 125, as shown. Alternatively, the arm 117 may include multiple sequentially extendable and retractable concentric telescoping sections. The arm 117 is preferably pivotally coupled to the body 101 about a pivot pin 128 and is operable via a hydraulic cylinder (not shown) to pivot the arm 117, relative to the body 101, in the direction of arrows 130 and 131. For reasons which should become apparent as this disclosure progresses, the pivotal connection at the pivot pin 128 is preferably located so as to provide the arm with an elongated arm tail portion 134 extending from the pivot pin 128 towards the rear portion 105 of the work machine 100.

Figure 2:
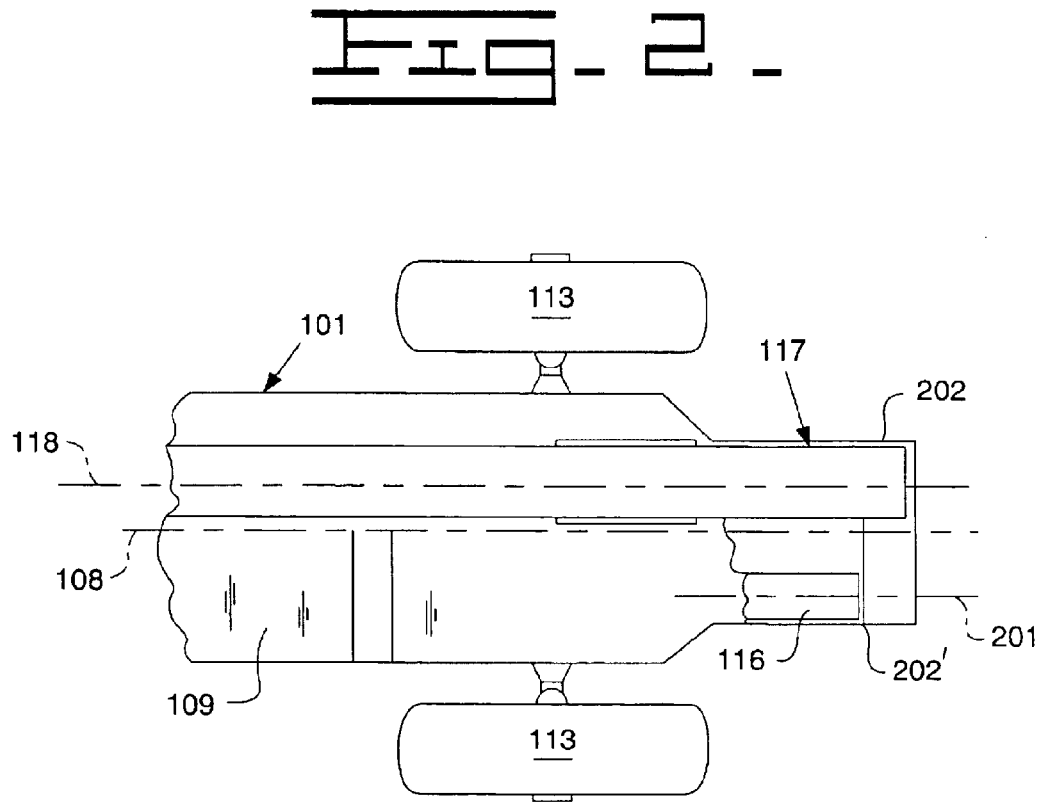
FIG. 2 is a diagrammatic top plan view of a rear portion of the work machine of FIG. 1.

With reference to FIG. 2, shown is the rear portion 105 of the work machine 100 with a portion of the body 101 removed for clarity. As shown, the exemplary radiator 116 described herein is preferably substantially rectangular in cross section having a radiator longitudinal axis denoted 201. The radiator 116 is mounted to the rear portion 105 such that the radiator longitudinal axis 201 is substantially parallel to the arm longitudinal axis 118. As should be appreciated, by orienting the radiator 116 in the aforementioned manner, a longer arm tail portion 134 may be provided which allows the arm 117 to have a greater reach without any substantial modifications to either the body 101 or location of the pin 128. In particular, for those work machines 100 of the type described herein in which the arm 117 is preferably mounted on one side (denoted herein as 202) of the body longitudinal centerline 108, the placement of the radiator longitudinal axis 201 on the other side (denoted herein as 202') of the body longitudinal centerline 108 minimizes substantial modifications of the body 101 to accommodate the preferred orientation of the radiator 116.

Shown in FIG. 3 is an elevational view of the rear portion 105 of the work machine 100 with the arm 117 positioned in different stages of articulation about pin 128. As shown, clockwise articulation of the arm 117 about pin 128 causes the arm tail portion 134 to sweep in an arc denoted 300. As should be apparent to those of ordinary skill in such art, any interference between the extended arm tail section 134 and the radiator 116 which would otherwise occur but for the placement of the radiator 116 in the aforementioned manner is eliminated.

Industrial Applicability

In the operation of the work machine 100 shown in FIG. 1, articulation of the arm 117 about pin 128 elevates the fork 125 to the desired vertical coordinate, whereas extension or retraction of the telescoping portion 121 places the fork 125 at the desired horizontal coordinate from the work machine 100. For those work machines 100 having rear mounted radiators 116, the maximum reach of the arm 117 is typically limited by the physical constraints imposed upon the vehicles such as, for example, the specified size and weight constraints of the work machine 100 as well as the placement of the radiator 116.

Orientating the radiator 116 such that the radiator's longitudinal axis 201 is substantially parallel with the arm longitudinal axis 118, as shown best in FIG. 2, allows for an extended arm tail portion 134. This, in turn, provides the work machine 100 with an increased reach while maintaining substantially the same body size, weight, and pin 128 location. As should also be appreciated by those of ordinary skill in such art, by orienting the radiator 116 in the aforementioned manner, the size of the radiator 116 need no longer be constrained by the transverse size limitation of the rear portion, thereby allowing the radiator 116 to have an increased longitudinal length.

Other aspects, objects and advantages of this invention can be obtained from a study of the drawings, the disclosure and the appended claims.

What is claimed is:

1. A work machine arrangement, comprising:
    a work machine body having a rear portion, said work machine body having a body longitudinal centerline;
    an engine coupled to said work machine body;
    a telescoping arm pivotally connected to said rear portion of said work machine body, said telescoping arm having an arm longitudinal axis located on one side of said body longitudinal centerline; and
    an engine cooling apparatus mounted to said rear portion of said work machine body, said engine cooling apparatus having an engine cooling apparatus longitudinal axis oriented substantially parallel to said arm longitudinal axis, said engine cooling apparatus located on the other side of said body longitudinal centerline.

2. The work machine arrangement as set forth in claim 1 wherein said telescopic arm includes a hollow base portion sized to receive a telescoping portion that is extendable and retractable relative to the base portion.

3. The work machine arrangement as set forth in claim 1 wherein said telescoping arm has an elevated orientation and a lowered orientation and is adapted to receive a load-carrying attachment, and wherein the telescoping arm is connected adjacent to a rear end thereof to the work machine body adjacent to a the rear end thereof so that the telescoping arm extends forwardly whereby, in the lowered orientation of the telescoping arm, the load-carrying attachment is disposed in front of the work machine body.

4. The work machine arrangement set forth in claim 1 wherein said telescopic arm is adapted to receive a load-carrying attachment at an end thereof and further comprising a hydraulic cylinder operable to elevate the end of said telescopic arm relative to the work machine body.

5. The work machine arrangement as set forth in claim 1 wherein said engine cooling apparatus comprises a radiator.

6. The work machine arrangement as set forth in claim 5 wherein said telescoping arm has an elevated orientation and a lowered orientation and as adapted to receive a load-carrying attachment, and wherein the telescoping arm is connected adjacent to a rear end thereof to the work machine body adjacent to a the rear end thereof so that the telescoping arm extends forwardly whereby, in the lowered orientation of the telescoping arm, the load-carrying attachment is disposed in front of the work machine body.

7. The work machine arrangement as set forth in claim 5 wherein said telescoping arm has an elevated orientation and a lowered orientation and is adapted to receive a load-carrying attachment, and wherein the telescoping arm is connected adjacent to a rear end thereof to the work machine body adjacent to a rear end thereof so that the telescoping arm extends forwardly whereby, in the lowered orientation of the telescoping arm, the load-carrying attachment is disposed in front of the work machine body.

8. A work machine arrangement for a work machine having an engine, comprising:
    a work machine body;
    a telescopic loading arm connected to said work machine body, said telescopic arm having an arm longitudinal axis and an end, said telescopic arm being adapted to receive a load-carrying attachment at the end; and
    an engine cooling apparatus mounted to said work machine body, said engine cooling apparatus having an engine cooling apparatus longitudinal axis oriented substantially parallel to said arm longitudinal axis;
    wherein said telescopic arm has an elevated orientation and a lowered orientation, and wherein the telescopic arm is connected adjacent to a rear end thereof to the work machine body adjacent to a the rear end thereof so that the telescopic arm extends forwardly whereby, in the lowered orientation of the telescopic arm, the load-carrying attachment is disposed in front of the work machine body.

9. A work machine arrangement for a work machine having an engine, comprising:
    a work machine body;
    a telescopic loading arm connected to said work machine body, said telescopic arm having an arm longitudinal axis and an end, said telescopic arm being adapted to receive an attachment at the end;
    a hydraulic cylinder operable to elevate the end of said telescopic arm relative to the work machine body; and
    an engine cooling apparatus mounted to said work machine body, said engine cooling apparatus having an engine cooling apparatus longitudinal axis oriented substantially parallel to said arm longitudinal axis;
    wherein said telescopic arm has an elevated orientation and a lowered orientation, and wherein the telescopic arm is connected adjacent to a rear end thereof to the work machine body adjacent to a the rear end thereof so that the telescopic arm extends forwardly whereby, in the lowered orientation of the telescopic arm, the load-carrying attachment is disposed in front of the work machine body.

10. The work machine arrangement as set forth in claim 9 wherein said engine cooling apparatus comprises a radiator.

11. The work machine arrangement as set forth in claim 9 wherein said telescopic arm includes a hollow base portion sized to receive a telescoping portion that is extendable and retractable relative to the base portion.

12. The work machine arrangement as set forth in claim 9 wherein said telescopic arm is pivotable relative to said work machine body.

13. The work machine arrangement as set forth in claim 9 wherein:
said work machine body has a longitudinal centerline;
said arm longitudinal axis is offset to one side of said body longitudinal axis; and
said engine cooling apparatus longitudinal axis is offset to the other side of said longitudinal axis.

14. The work machine arrangement as set forth in claim 9 wherein:
said work machine body includes a rear portion; and
said engine cooling apparatus is mounted to said rear portion of said work machine body.

* * * * *

UNITED STATES PATENT AND TRADEMARK OFFICE
CERTIFICATE OF CORRECTION

PATENT NO.   : 6,910,544 B2                                                                 Page 1 of 1
DATED        : June 28, 2005
INVENTOR(S)  : Andrew J. Sewell It is certified that error appears in the above-identified patent and that said Letters Patent is hereby corrected as shown below:

<u>Column 3,</u>
Line 62, delete "as" and insert -- is --.

Signed and Sealed this

Thirteenth Day of December, 2005

JON W. DUDAS
*Director of the United States Patent and Trademark Office*